US011009152B2

(12) United States Patent
Case et al.

(10) Patent No.: US 11,009,152 B2
(45) Date of Patent: *May 18, 2021

(54) SYSTEM AND METHOD FOR DEPLOYING COILS OF SPOOLABLE PIPE

(71) Applicant: TRINITY BAY EQUIPMENT HOLDINGS, LLC, Houston, TX (US)

(72) Inventors: Michael Case, Houston, TX (US); Glenn Tucker, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/890,416

(22) Filed: Jun. 2, 2020

(65) Prior Publication Data
US 2020/0292101 A1    Sep. 17, 2020

Related U.S. Application Data

(63) Continuation of application No. 16/282,502, filed on Feb. 22, 2019, now Pat. No. 10,670,167.
(Continued)

(51) Int. Cl.
*F16L 1/20* (2006.01)
*F16L 1/23* (2006.01)
(Continued)

(52) U.S. Cl.
CPC .................. *F16L 1/203* (2013.01); *F16L 1/14* (2013.01); *F16L 1/205* (2013.01); *F16L 1/207* (2013.01);
(Continued)

(58) Field of Classification Search
CPC . F16L 1/203; F16L 1/205; F16L 1/207; F16L 1/225; F16L 1/23
(Continued)

(56) References Cited

U.S. PATENT DOCUMENTS 972,928 A    10/1910  Schneider
2,008,612 A   7/1935  Heath
(Continued)

FOREIGN PATENT DOCUMENTS

EP    3199481      1/2016
GB    2554678      4/2018
WO    2018/071299  4/2018

OTHER PUBLICATIONS

PCT International Search Report and the Written Opinion of the International Searching Authority, issued in connection to PCT/US19/19165; dated May 14, 2019; 11 pages; US.
(Continued)

*Primary Examiner* — Frederick L Lagman
(74) *Attorney, Agent, or Firm* — Greenberg Traurig, LLP; Dwayne Mason

(57) ABSTRACT

A system for deploying a coil of spoolable pipe from a vessel includes a first tower configured to move longitudinally and transversely along a first track coupled to the vessel, a second tower configured to move longitudinally along a second track coupled to the vessel, and a coil drum assembly coupled to the first tower. The first tower is configured to insert the coil drum assembly transversely into an interior channel of the coil when the coil drum assembly is in a retracted position, the coil drum assembly is configured to support the coil when the coil drum assembly is in an extended position and rotate during deployment of the spoolable pipe, and the first tower and the second tower are configured to move the coil drum assembly vertically.

20 Claims, 16 Drawing Sheets

Related U.S. Application Data

(60) Provisional application No. 62/633,687, filed on Feb. 22, 2018.

(51) Int. Cl.
  *F16L 1/14* (2006.01)
  *B65H 23/04* (2006.01)
  *B65H 16/02* (2006.01)
  *F16L 1/18* (2006.01)

(52) U.S. Cl.
  CPC ............ *F16L 1/23* (2013.01); *B65H 16/02* (2013.01); *B65H 23/04* (2013.01); *F16L 1/18* (2013.01)

(58) Field of Classification Search
  USPC .................................. 405/166, 168.3, 168.4
  See application file for complete search history.

(56) References Cited

U.S. PATENT DOCUMENTS

| | | | |
|---|---|---|---|
| 4,260,287 A * | 4/1981 | Uyeda | B63B 35/03 242/390.6 |
| 4,284,249 A | 8/1981 | Legallasi et al. | |
| 4,594,871 A * | 6/1986 | de Boer | B65H 75/425 405/168.3 |
| 4,789,108 A | 12/1988 | Recalde | |
| 5,676,009 A | 10/1997 | Bright et al. | |
| 5,895,197 A | 4/1999 | McVaugh | |
| 6,419,424 B1 | 7/2002 | Null et al. | |
| 8,985,496 B2 | 3/2015 | Dillinger | |
| 10,670,167 B2 | 6/2020 | Case | |
| 2009/0324339 A1 | 12/2009 | Roodenburg | |
| 2010/0158613 A1 | 6/2010 | Bereznitski | |
| 2012/0148348 A1 | 6/2012 | Stockstill | |
| 2013/0051920 A1 | 2/2013 | Roodenburg | |
| 2013/0251456 A1 | 9/2013 | Haugen | |
| 2013/0287498 A1 | 10/2013 | Roodenburg | |
| 2014/0375049 A1 | 12/2014 | Mair | |
| 2015/0298773 A1 | 10/2015 | Baylot | |
| 2016/0185565 A1 * | 6/2016 | Tiberio | H02G 1/10 414/800 |
| 2017/0321490 A1 | 11/2017 | Haavind | |
| 2017/0328494 A1 | 11/2017 | Finch | |
| 2018/0186269 A1 | 7/2018 | Barnett | |
| 2019/0257445 A1 | 8/2019 | Case | |

OTHER PUBLICATIONS

Pakistan Patent Office; Examination Report, issued in connection with application No. 116/2019; 1 page; dated 2020; Pakistan.

\* cited by examiner

SYSTEM AND METHOD FOR DEPLOYING COILS OF SPOOLABLE PIPE

This application claims the benefit, and priority benefit of U.S. Provisional Application No. 62/633,687 filed on Feb. 22, 2018, the disclosure of which is incorporated by reference herein in its entirety.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

Coils of pipe may be positioned in an "eye to the side" or "eye to the sky" orientation. When the flexible pipe is coiled and is disposed with its interior channel facing upwards, such that the coil is in a horizontal orientation, then the coils of pipe are referred to as being in an "eye to the sky" orientation. If, instead, the flexible pipe is coiled and disposed such that the interior channel is not facing upwards, such that the coil is in an upright or vertical orientation, then the coils of pipe are referred to as being in an "eye to the side" orientation.

The flexible pipe may be transported as coils to various sites for deployment (also referred to as uncoiling or unspooling). Different types of devices and vehicles are currently used for loading and transporting coils of pipe, but usually extra equipment and human manual labor is also involved in the process of loading or unloading such coils for transportation and/or deployment. Such coils of pipe are often quite large and heavy. Accordingly, there exists a need for an improved method and apparatus for loading and unloading coils of pipe.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a system for deploying a coil of spoolable pipe from a vessel that includes a first tower configured to move longitudinally and transversely along a first track coupled to the vessel, a second tower configured to move longitudinally along a second track coupled to the vessel, and a coil drum assembly coupled to the first tower. The first tower is configured to insert the coil drum assembly transversely into an interior channel of the coil when the coil drum assembly is in a retracted position, the coil drum assembly is configured to support the coil when the coil drum assembly is in an extended position and rotate during deployment of the spoolable pipe, and the first tower and the second tower are configured to move the coil drum assembly vertically.

In another aspect, embodiments of the present disclosure relate to a method that includes moving a first tower and a coil drum assembly coupled to the first tower longitudinally along a first track coupled to a vessel to a location of a first coil of spoolable pipe, moving a second tower longitudinally along a second track coupled to the vessel to the location of the first coil of spoolable pipe, retracting a coil drum assembly into a retracted position, moving the first tower transversely along the first track to insert the coil drum assembly into an interior channel of the first coil when the coil drum assembly is in the retracted position, extending the coil drum assembly into an extended position to support the first coil, moving the coil drum assembly upwardly using the first tower and the second tower, and rotating the coil drum assembly to deploy the first coil.

Other aspects and advantages of the claimed subject matter will be apparent from the following description and the appended claims.

DETAILED DESCRIPTION

Figure 1:
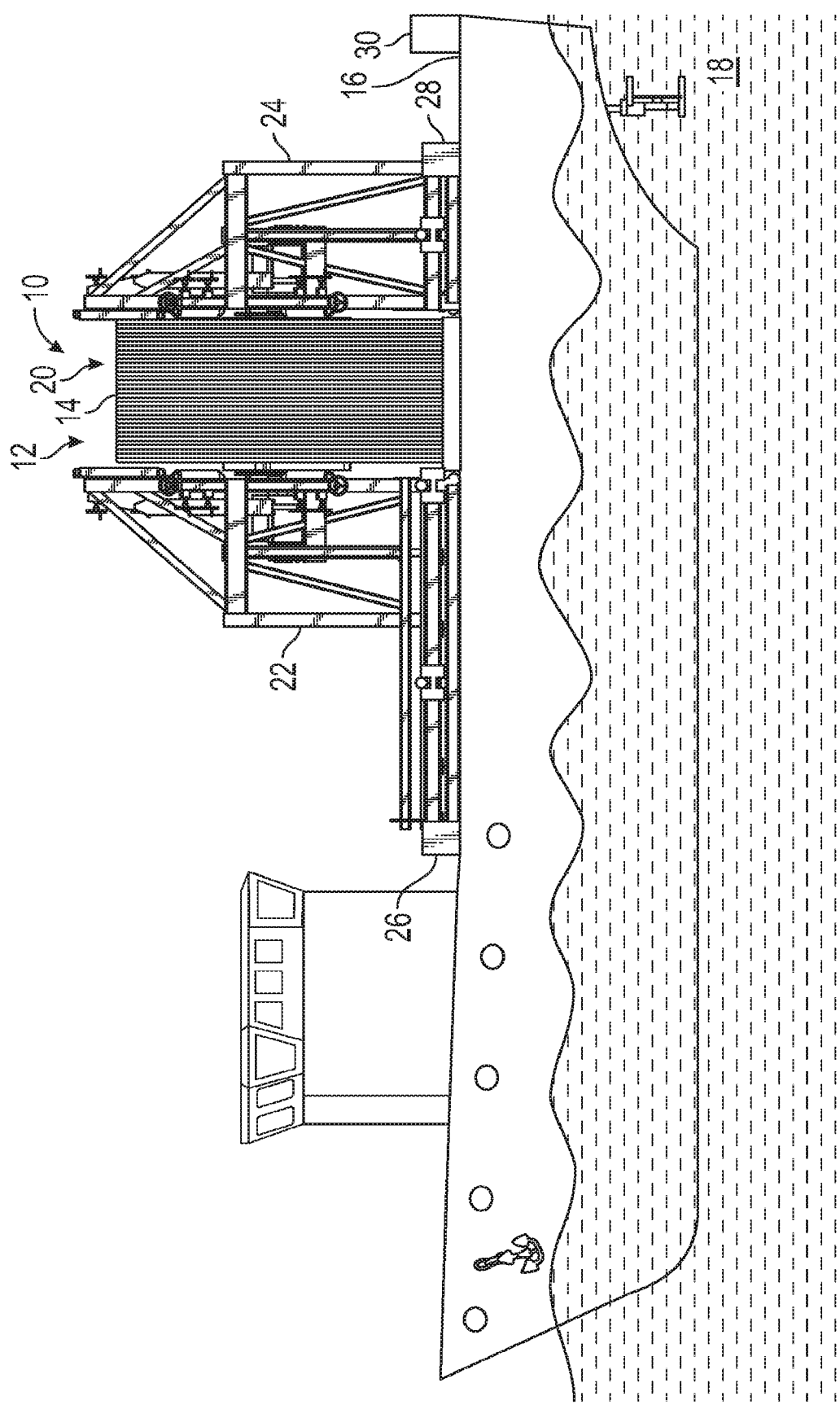
FIG. 1 is a block diagram of a coil deployment system according to embodiments of the present disclosure.

Embodiments of the present disclosure relate generally to systems used for deploying coils of spoolable pipe. The coils of pipe may be self-supported, for example, using bands to hold coils together. Coil deployment systems according to embodiments of the present disclosure may include a first tower configured to move along a first track, a second tower configured to move along a second track, and a coil drum assembly coupled to the first tower. The coil deployment system may be used to handle a plurality of coils disposed on the deck of a vessel.

Embodiments of the present disclosure will be described below with reference to the figures. In one aspect, embodiments disclosed herein relate to embodiments for deploying coils of spoolable pipe into a body of water from vessels having the coil deployment system.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

FIG. 1 illustrates a block diagram of an embodiment of a coil deployment system 10 for deploying a coil 12 of spoolable pipe 14 from a vessel 16. Spoolable pipe 14 may refer to any type of flexible pipe or piping capable of being bent into a coil. Such coils of spoolable pipe 14 may reduce the amount of space taken up by pipe during manufacturing, shipping, transportation, and deployment compared to rigid pipe that is not capable of being bent into a coil.

Pipe, as understood by those of ordinary skill, may be a tube to convey or transfer any water, gas, oil, or any type of fluid known to those skilled in the art. The spoolable pipe 14 may be made of any type of materials including without limitation plastics, metals, a combination thereof, composites (e.g., fiber reinforced composites), or other materials known in the art. One type of spoolable pipe 14 is flexible pipe, which is used frequently in many applications, including without limitation, both onshore and offshore oil and gas applications. Flexible pipe may include Bonded or Unbonded Flexible Pipe, Flexible Composite Pipe (FCP), Thermoplastic Composite Pipe (TCP), or Reinforced Thermoplastic Pipe (RTP). A FCP or RTP pipe may itself be generally composed of several layers. In one or more embodiments, a flexible pipe may include a high-density polyethylene ("HDPE") liner having a reinforcement layer and an HDPE outer cover layer. Thus, flexible pipe may include different layers that may be made of a variety of materials and also may be treated for corrosion resistance. For example, in one or more embodiments, pipe used to make up a coil of pipe may have a corrosion protection shield layer that is disposed over another layer of steel reinforcement. In this steel-reinforced layer, helically wound steel strips may be placed over a liner made of thermoplastic pipe. Flexible pipe may be designed to handle a variety of pressures, temperatures, and conveyed fluids. Further, flexible pipe may offer unique features and benefits versus steel/carbon steel pipe lines in the area of corrosion resistance, flexibility, installation speed and re-usability. Another type of spoolable pipe is coiled tubing. Coiled tubing may be made of steel. Coiled tubing may also have a corrosion protection shield layer.

Vessel 16 may refer to ships, barges, boats, watercrafts, or any other type of water-borne vehicles capable of being used for offshore deployment of spoolable pipe 14 into a body of water 18, such as a lake, sea, or ocean. The coil deployment system 10 also includes a coil drum assembly 20, a first tower 22, and a second tower 24, which are all described in more detail below. In certain embodiments, the coil drum assembly 20 is coupled to the first tower 22, and both the coil drum assembly 20 and the first tower 22 may be configured to move along a first track 26 coupled to the vessel 16. The second tower 24 may be configured to move along a second track 28 coupled to the vessel 16. In certain embodiments, the coil deployment system 10 may include other ancillary equipment 30 described in detail below for handling the spoolable pipe 14 as it deploys from the coil drum assembly 20 and guiding the spoolable pipe 14 into the body of water 18. In further embodiments, the coil deployment system 10 may be removably coupled to the vessel 16. In other words, the coil deployment system 10 may be installed on vessels 16 not specifically designed for deploying coils 12 and then removed from the vessels 16 after deployment of the coils 12 is complete. In other embodiments, vessels 16 may be built or constructed to be used specifically for the coil deployment system 10 and the coil deployment system 10 may be permanently installed on the vessels 16. In certain embodiments, vessel 16 may refer to non-water-borne vehicles, such as the bed of a land-based vehicle. Thus, references to ships and deployment into water are meant to be non-limiting.

Figure 2:
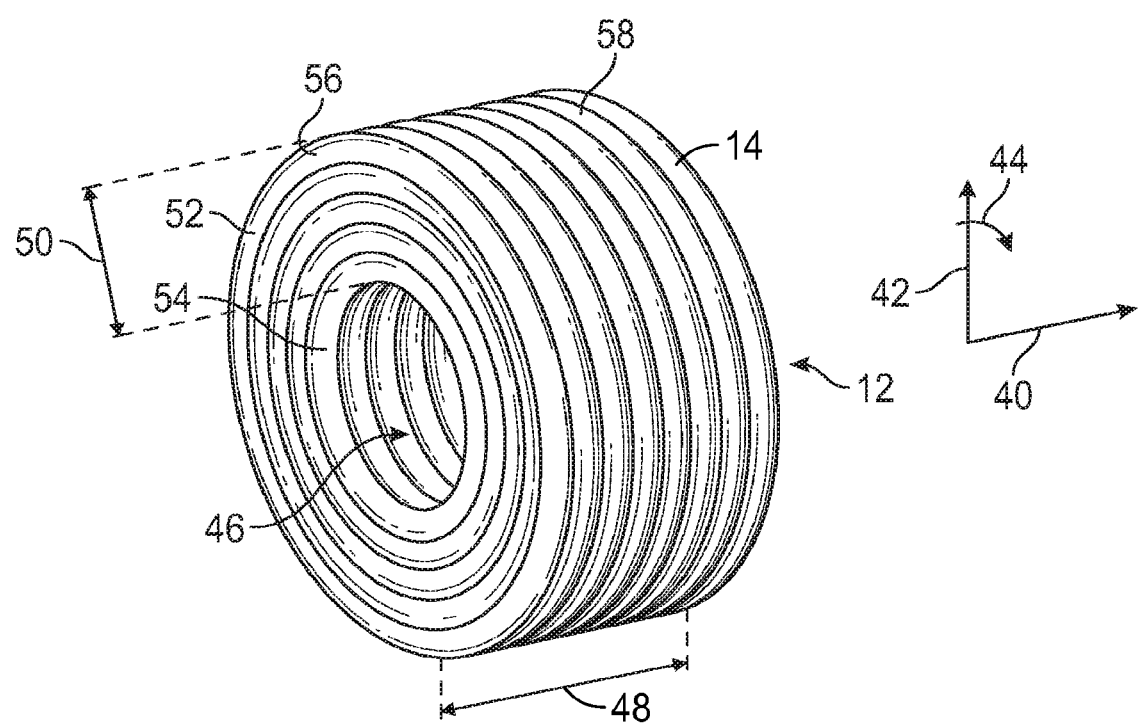
FIG. 2 is a perspective view of an embodiment of a coil of spoolable pipe according to embodiments of the present disclosure.

FIG. 2 illustrates a perspective view of an embodiment of the coil 12 of spoolable pipe 14. The coil 12 may be defined by an axial axis or direction 40, a radial axis or direction 42, and a circumferential axis or direction 44. The coil 12 may be formed by wrapping the spoolable pipe 14 into a coil with an interior channel 46 formed axially 40 therethrough, where the coil 12 may be moved as a single package or bundle of coiled pipe, as shown in FIG. 2. Each complete turn of coiled pipe may be referred to as a wrap of pipe. Multiple wraps of pipe in the coil 12 may be configured in columns along the axial direction 40 of the coil 12 and/or configured in layers along the radial direction 42 of the coil 12. For example, multiple columns of wraps may be formed along the axial direction 40 of the coil 12, where an axial dimension 48 of the coil 12 is based on the diameter of the pipe 14 and the number and axial 40 position of wraps forming the coil 12. Further, multiple layers of wraps may be formed along the radial direction 42 of the coil 12, where a radial dimension 50 of the coil 12 is based on the diameter of the pipe and the number and radial 42 position of the wraps forming the coil 12. In certain embodiments, a weight of the coil 12 may exceed 40,000 pounds (18,144 kilograms), or exceed 60,000 pounds (27,216 kilograms).

As shown in FIG. 2, the coil 12 of spoolable pipe 14 may be one or more layers (e.g., layers 52 and 54) of pipe packaged or bundled into the coil 12. The coil 12 may include at least one or more layers of pipe that have been coiled into a particular shape or arrangement. As shown in FIG. 2, the coil 12 is coiled into a substantially cylindrical shape, where the axial dimension 48 of the coil 12 is measured between outer edges 56 and 58 of the coil 12.

As known to those of ordinary skill in the art, the spoolable pipe 14 used to make up the coil 12 shown in FIG. 2 may be coiled using spoolers or other coiler machines suited for such a function. Those of ordinary skill will recognize that the present disclosure is not limited to any particular form of coiler or other device that may be used to form pipe into a coil. Winding pipe into a coil, such as coil 12, assists when transporting pipe, which may be several hundred feet in length in one or more embodiments. Further, the coil 12 may be wound to facilitate deployment of the coil. Deployment, as used herein, may refer to the action of unspooling or unwinding the spoolable pipe 14 from the coil 12.

After being assembled into a coil, the coil 12 shown in FIG. 2 may include the interior channel 46 formed axially 40 through the coil 12. The interior channel 46 is a bore disposed generally in the center of the coil 12. The interior channel 46 may be substantially circular-shaped. The coil 12 may have an outer diameter (OD) and an inner diameter (ID), where the inner diameter is defined by the interior channel 46.

Figure 3:
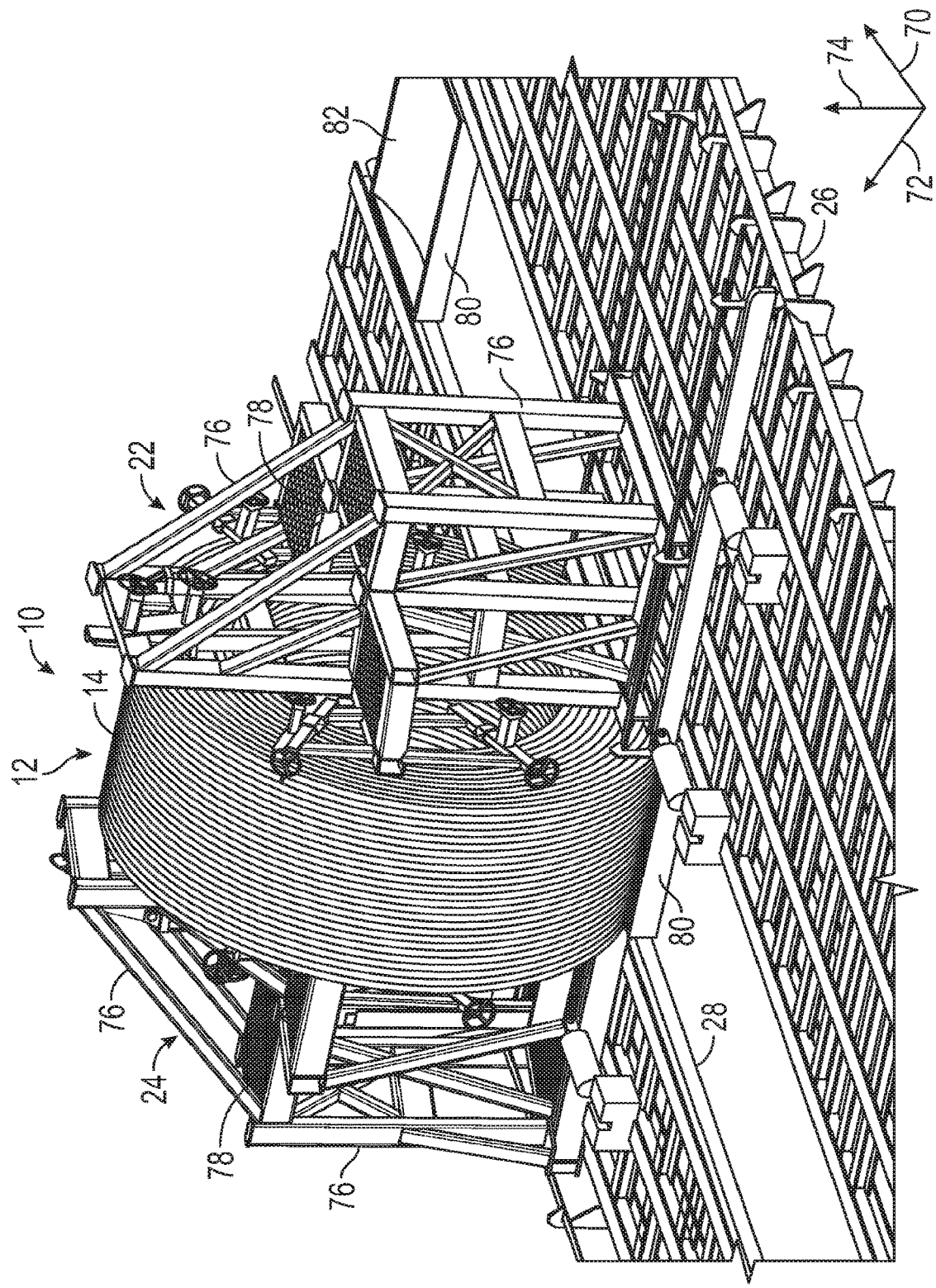
FIG. 3 is a perspective view of an embodiment of a coil deployment system according to embodiments of the present disclosure

FIG. 3 illustrates a perspective view of an embodiment of the coil deployment system 10, which may be defined by a longitudinal axis or direction 70, a transverse axis or direction 72, and a vertical axis or direction 74. The coil 12 of spoolable pipe 14 is disposed on the coil drum assembly 20 (not visible in FIG. 3), which is coupled to and disposed between the first tower 22 and the second tower 24. The components, features, and operation of the coil drum assembly 20 are described in more detail below.

The first tower 22 is configured to move longitudinally 70 and transversely 72 along the first track 26 via components that are described in more detail below. The first tower 22 includes one or more structural members 76 to support these components and provide an overall structure for the first tower 22. The structural members 76 may be made from steel beams, columns, rods, composite structural members, and so forth, coupled to one another via various fastening techniques, such as welding, brazing, bolts, rivets, screws, and so forth. In addition, the first tower 22 may include one or more platforms 78 and ladders (not shown) to provide personnel access to the components of the first tower 22.

The second tower 24 is configured to move longitudinally 70 along the second track 28 via components that are described in more detail below. As shown in FIG. 3, the first and second tracks 26 and 28 may be generally parallel to one another. The second tower 24 also includes one or more structural members 76 and one or more platforms 78 similar to those of the first tower 22. In certain embodiments, the second tower 24 may be configured identically to the first tower 22 to enable the second tower 24 to move longitudinally 70 and transversely 72 along the second track 28.

Both the first track 26 and the second track 28 are coupled to the deck of the vessel 16 (not shown in FIG. 3). Further, the first tower 22 and the second tower 24 are configured to move the coil drum assembly 20 vertically 74. In certain embodiments, the coil 12 may rest on a skid 80 prior to handling by the coil deployment system 10. The skid 80 may include a platform 82 that has a concave curvature shape on its upward facing side that generally corresponds to the outer circumferential shape of the coil 12. The skid 80 may be made from metal, wood, plastic, or other materials capable of supporting the weight of the coil 12.

Figure 4:
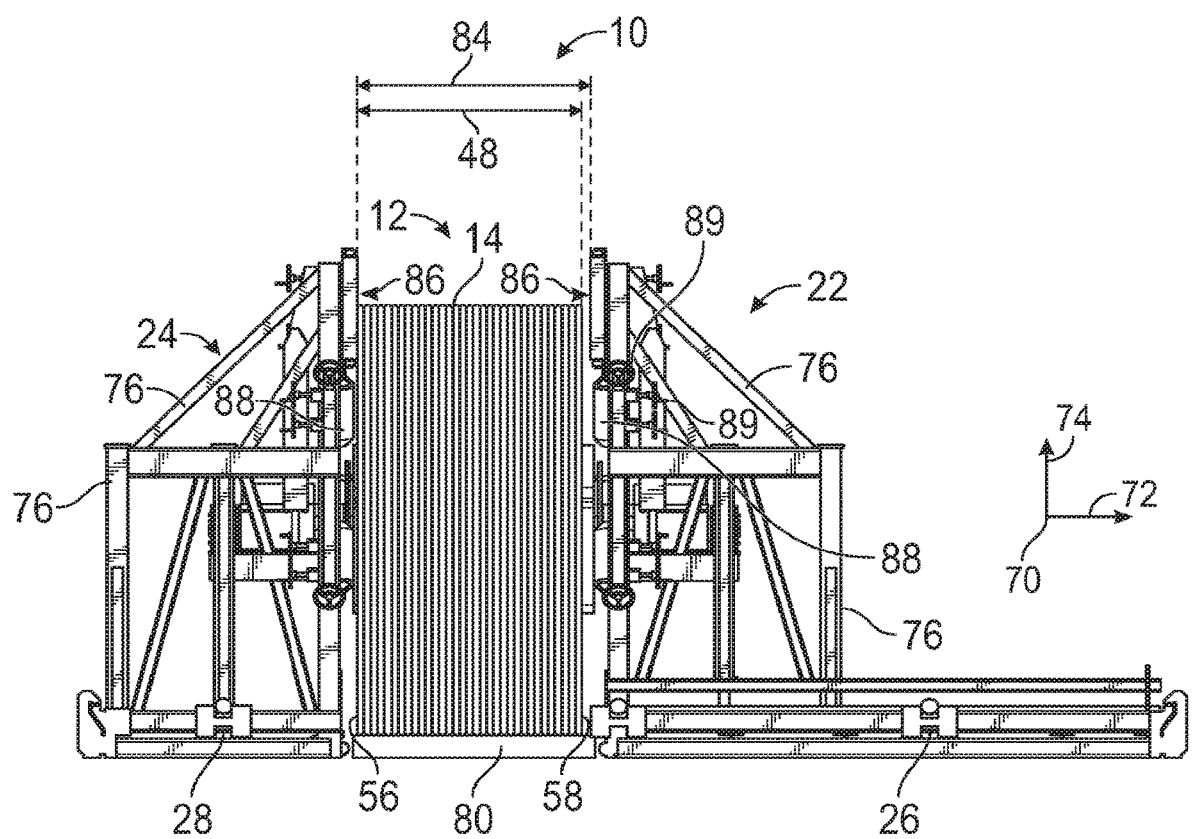
FIG. 4 is a front view of an embodiment of a coil deployment system according to embodiments of the present disclosure.

FIG. 4 illustrates a front view of an embodiment of the coil deployment system 10. Again, the coil 12 of spoolable pipe 14 is disposed on the coil drum assembly 20 (not visible in FIG. 4), which is coupled to and disposed between the first tower 22 and the second tower 24. As shown in FIG. 4, the coil 12 has the axial dimension 48 and during deployment of the coil 12, the first tower 22 and second tower 24 are spaced apart from one another by a tower spacing 84 that is approximately equal to or greater than the axial dimension 48. Thus, the first tower 22 and second tower 24 provide at least some support to the outer edges 56 and 58 so the coil 12 does not expand or move beyond the tower spacing 84 during deployment. In certain embodiments, the first tower 22 and second tower 24 may each include a coil containment system 86 configured to contain the spoolable pipe 14 between the coil containment systems 86. For example, the coil containment system 86 may include a flange or other structure with a square, rectangular, circular, oval, or other shape that faces the outer edges 56 and 58, and may or may not rotate together with the coil deployment drum 20. In some embodiments, the coil containment system 86 may include one or more rollers 88 to reduce friction between the spoolable pipe 14 and the coil containment system 86. The coil containment system 86 and/or the rollers 88 may be movable transversely 72 via one or more adjustment wheels 89 to be touching or proximate to the outer edges 56 and 58. In other embodiments, the adjustment wheels 89 may be used to further adjust the position of the coil containment system 86 and/or the rollers 88, such as radially 42 or circumferentially 44, thereby enabling the coil containment system 86 to be used with coils 12 with different dimensions. In further embodiments, the coil containment system 86 may include other features for friction reduction, such as a low-friction surface, bearings, and so forth. In certain embodiments the coil containment system 86 may be coupled directly to the coil drum assembly 20 rather than being components of the first and second towers 22 and 24.

In addition, the first tower 22 is configured to move longitudinally 70 and transversely 72 along the first track 26. The second tower 24 is configured to move longitudinally 70 along the second track 28. Further, the first tower 22 and the second tower 24 are configured to move the coil drum assembly 20 vertically 74. Components for achieving such movement are described in detail below.

Figure 5:
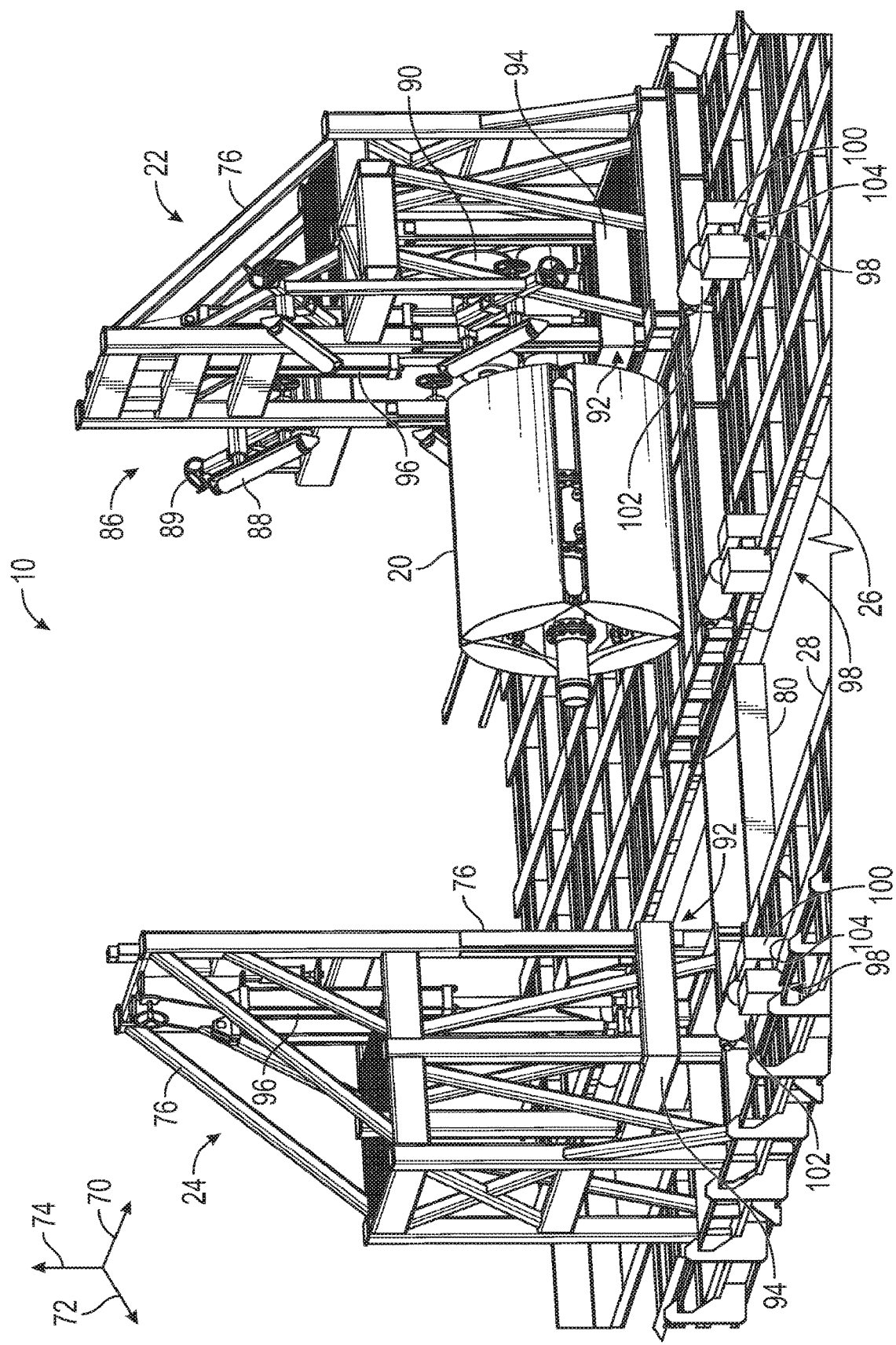
FIG. 5 is a perspective view of an embodiment of a coil deployment system according to embodiments of the present disclosure.

FIG. 5 illustrates a perspective view of an embodiment of the coil deployment system 10. The coil 12 is omitted in FIG. 5 to provide better visibility of the various components of the coil deployment system 10, although the skid 80 is shown to indicate the position of the coil 12. As shown in FIG. 5, the coil drum assembly 20 is in a retracted position to enable the coil drum assembly 20 to be inserted into the interior channel 46 of the coil 12. The components and operation of the coil drum assembly 20 are described in more detail below.

As shown in FIG. 5, the coil drum assembly 20 is coupled to the first tower 22. In certain embodiments, the first tower 22 includes a rotational drive 90 configured to rotate the coil drum assembly 20. In certain embodiments, the rotational drive 90 may include a motor that engages with the coil drum assembly 20 directly (e.g., couples to rotating component of the coil drum assembly 20) or indirectly (e.g., through one or more gears or a transmission). The rotational drive 90 may be used to deploy the spoolable pipe 14 (e.g., advance the spoolable pipe 14 from the coil 12) or to re-spool the spoolable pipe 14 (e.g., retract the spoolable pipe 14 back onto the coil 12). Re-spooling may be used to recover portions of spoolable pipe 14 that have already been deployed. A gearbox reduction assembly may be used for re-spooling in certain embodiments. The operation of the rotational drive 90 is described in more detail below.

In further embodiments, the first tower 22 and the second tower 24 each includes a lift assembly 92 configured to move the coil drum assembly 20 vertically 74. In certain embodiments, each lift assembly 92 includes a lifting platform 94 and one or more hydraulic cylinders 96 coupled to the respective tower 22 or 24 and the lifting platform 94. For example, the lifting platform 94 may slidingly engage with one or more structural members 76 of the respective tower 22 or 24, and the hydraulic cylinder 96 may be extended or retracted. Thus, to move the respective lift assembly 92 vertically 74 downward (e.g., toward the respective track 26 or 28), the hydraulic cylinder 96 may be extended to move the lifting platform 94 away from the stationary portion of the hydraulic cylinder 96. Similarly, to move the respective lift assembly 92 vertically 74 upward (e.g., away from the respective track 26 or 28), the hydraulic cylinder 96 may be retracted to move the lifting platform 94 toward the stationary portion of the hydraulic cylinder 96. In other embodiments, a variety of different techniques may be used for moving the lift assembly 92 and coil drum assembly 20 vertically 74. For example, a rack and pinion system may be used or the coil drum assembly 20 may be coupled to a rotating drive of the lift assembly 92 via a cable or belt to enable the coil drum assembly 20 to be lifted or lowered. Alternatively, the lift assembly 92 may include wheels or a continuous track that move along the structural member 76 to propel or push the lift assembly 92 and coil drum assembly 20 vertically 74.

In yet further embodiments, the first tower 22 and the second tower 24 each includes a longitudinal drive 98 configured to move the first tower 22 longitudinally 70 along the first track 26 and the second tower 24 longitudinally 70 along the second track 28 respectively. In certain embodiments, each longitudinal drive 98 includes a gripping assembly 100 slidingly engaged with the respective track 26 or 28 and a hydraulic cylinder 102 coupled to the respective tower 22 or 24 and the gripping assembly 100. For example, the gripping assembly 100 may slidingly engage with a horizontal strip 104 of the respective track 26 or 28. The gripping assembly 100 may include one or more calipers, fingers, pads, and so forth (not shown in FIG. 5), that can be actuated to grip opposite sides of the horizontal strip 104. When the calipers or other gripping components of the gripping assembly 100 are not actuated, the gripping assembly 100 may be able to freely slide along the horizontal strip 104. The hydraulic cylinder 102 may be extended or retracted. Thus, to move the respective tower 22 or 24 longitudinally 70, the hydraulic cylinder 102 may first be extended to move the gripping assembly 100 away from the respective tower 22 or 24 while the gripping assembly 100 is not actuated (e.g., not gripping the horizontal strip 104). Next, the gripping assembly 100 may be actuated to grip the horizontal strip 104. Finally, the hydraulic cylinder 102 may be retracted to pull the respective tower 22 or 24 longitudinally 70 toward the gripping assembly 100. This process may be repeated to move the respective tower 22 or 24 a desired distance longitudinally 70 along the respective track 26 or 28. In other embodiments, a variety of different techniques may be used for moving the respective tower 22 or 24 longitudinally 70. For example, the respective tower 22 or 24 may be coupled to a rotating drive via a cable or belt to enable the respective tower 22 or 24 to be pulled longitudinally 70. Alternatively, the respective tower 22 or 24 may include wheels or a continuous track that enables the respective tower 22 or 24 to be propelled or pushed longitudinally 70 along the respective track 26 or 28. In further embodiments, the hydraulic cylinder 102 may be replaced with a rack and pinion system.

In certain embodiments, the first tower 22 includes a drag brake configured to apply a braking force to stop or slow the rotation of the coil drum assembly 20. For example, the drag brake may apply a braking force directly to a rotating component of the coil drum assembly 20, the rotational drive 90, or another rotating component of the first tower 22. The drag brake may be a caliper brake, a drum brake, a disc brake, a transmission, or other device capable of slowing or stopping the rotation of the coil drum assembly 20. The drag brake may be used to provide back tension to the coil drum assembly 20 during deployment of the spoolable pipe 14. In other words, the drag brake may help prevent undesired unspooling, free-spooling, or backlash of the spoolable pipe 14. In some embodiments, the functionality of the drag brake may be incorporated into the rotational drive 90.

Figure 6:
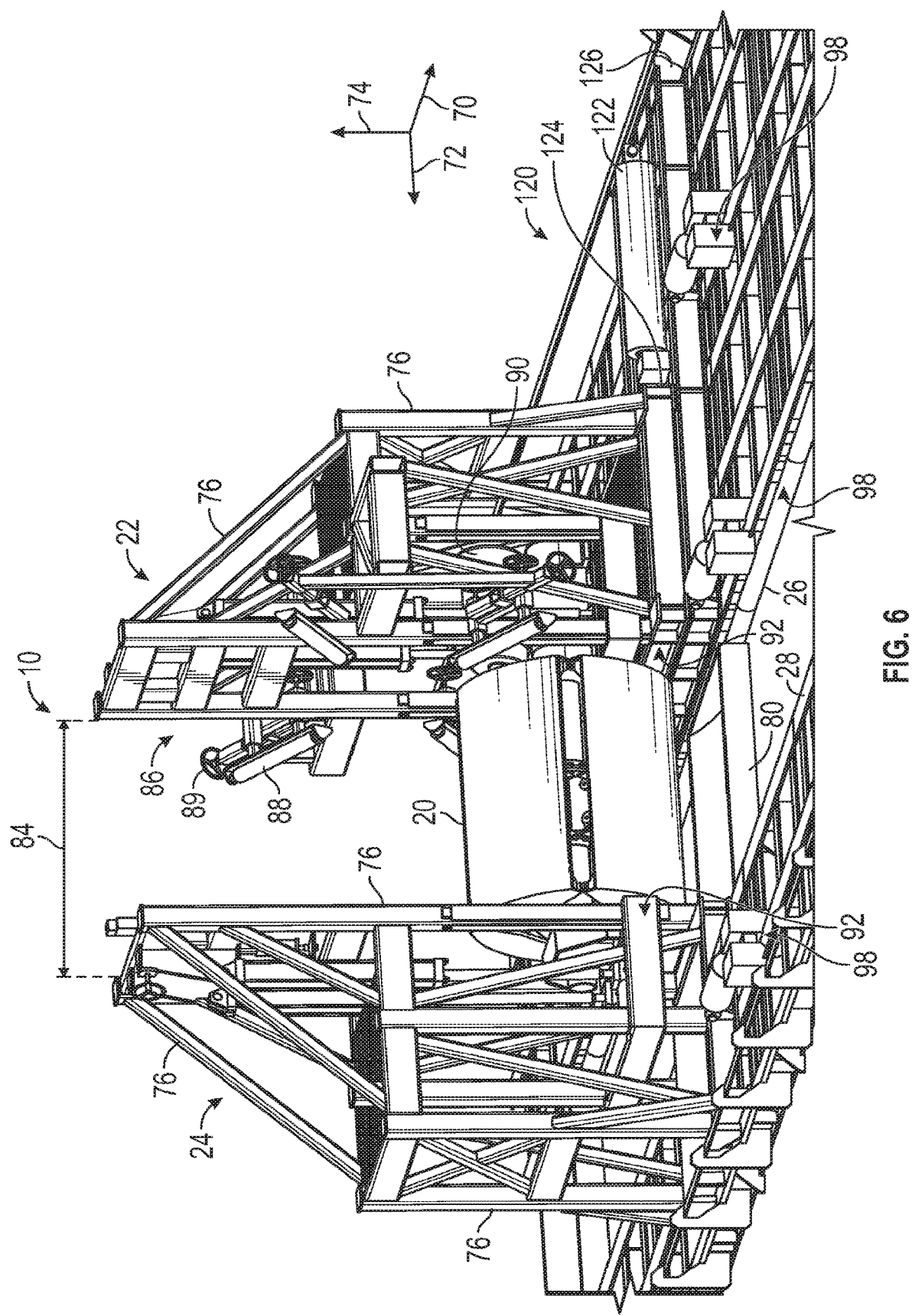
FIG. 6 is a perspective view of an embodiment of a coil deployment system according to embodiments of the present disclosure.

FIG. 6 illustrates a perspective view of an embodiment of the coil deployment system 10. As shown in FIG. 6, the first tower 22 and the coil drum assembly 20 have been moved transversely 72 toward the second tower 24. As such, the first tower 22 is separated from the second tower 24 by the tower spacing 84. In addition, the coil drum assembly 20 is coupled to the lift assembly 92 of the second tower 24. Thus, the lift assemblies 92 of the first tower 22 and second tower 24 can be used together to move the coil drum assembly 20 vertically 74.

In certain embodiments, the first tower 22 includes a transverse drive 120 configured to move the first tower 22 transversely 72. In certain embodiments, the transverse drive 120 includes a hydraulic cylinder 122 coupled to a movable portion 124 of the first tower 22 and a fixed portion 126. For example, the movable portion 124 may slidingly engage with the fixed portion 126. The hydraulic cylinder 122 may be extended or retracted. Thus, to move the movable portion 124 of the first tower 22 transversely 72 toward the second tower 24, the hydraulic cylinder 122 may be extended to move the movable portion 124 away from the stationary portion of the hydraulic cylinder 122. Similarly, to move the movable portion 124 of the first tower 22 transversely 72 away from the second tower 24, the hydraulic cylinder 122 may be retracted to move the movable portion 124 toward the stationary portion of the hydraulic cylinder 122. In other embodiments, a variety of different techniques may be used for moving the first tower 22 transversely 72. For example, a rack and pinion system may be used or the movable portion 124 may be coupled to a rotating drive of the fixed portion 126 via a cable or belt to enable the first tower 22 to be moved toward or away from the second tower 24. Alternatively, the movable portion 124 may include wheels or a continuous track that move along the fixed portion 126 to propel or push the first tower 22 transversely 72.

Figure 7:
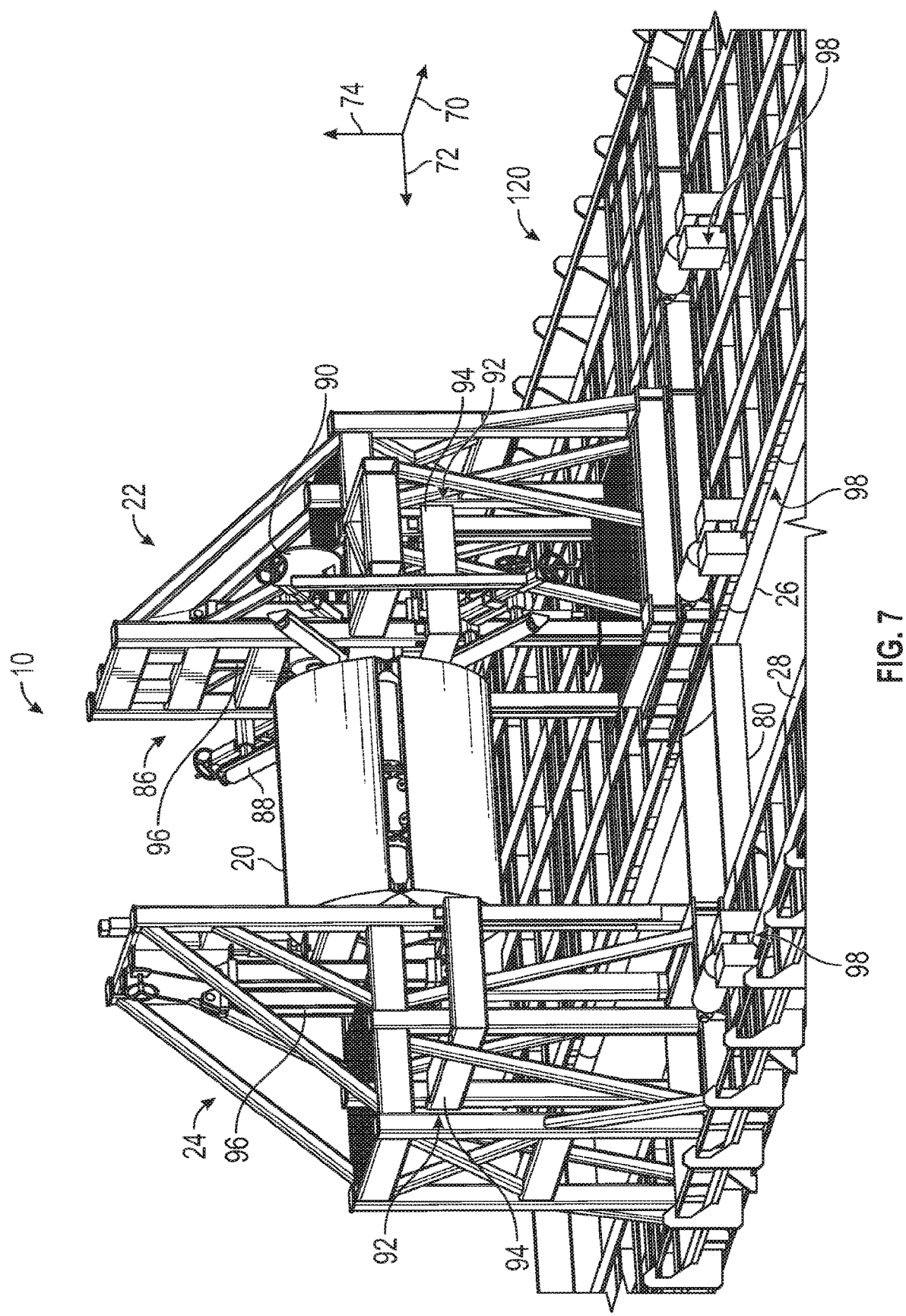
FIG. 7 is a perspective view of an embodiment of a coil deployment system according to embodiments of the present disclosure.

FIG. 7 illustrates a perspective view of an embodiment of the coil deployment system 10. As shown in FIG. 7, the coil drum assembly 20 has been moved vertically 74 upward (e.g., away from first track 26 and second track 28). As such, there is additional clearance between the spoolable pipe 14 and the deck of the vessel 16 as the coil 12 deploys. In the illustrated embodiment, the hydraulic cylinders 96 of the lift assemblies 92 of the first tower 22 and second tower 24 have been retracted to move the lifting platforms 94 toward the stationary portions of the hydraulic cylinders 96, thereby raising the coil drum assembly 20 vertically 74. In this position, the outer edges 56 and 58 of the coil 12 may be adjacent to the coil containment system 86 and/or rollers 88 to provide sufficient containment of the deploying spoolable pipe 14. After the spoolable pipe 14 has been deployed from the coil 12, the coil drum assembly 20 may be moved vertically 74 downward (e.g., toward the first track 26 and second track 28) via the lift assemblies 92, the first tower 22 moved transversely 72 away from the second tower 24 via the transverse drive 120, and the first tower 22 and second tower 24 moved longitudinally 70 via the longitudinal drives 98 to another coil 12 for deployment. When the transverse drive 120 is used to move the first tower 22 and coil drum assembly 20 away from the second tower 24, the first tower 22 and coil drum assembly 20 can be moved longitudinally 70 without contacting coils 12 disposed between the first and second tracks 26 and 28. Thus, the stroke of the hydraulic cylinder 122 may be selected to move the first tower 22 and coil drum assembly 20 sufficiently transversely 72 to avoid contact with coils 12 having a maximum expected axial dimension 48.

Figure 8:
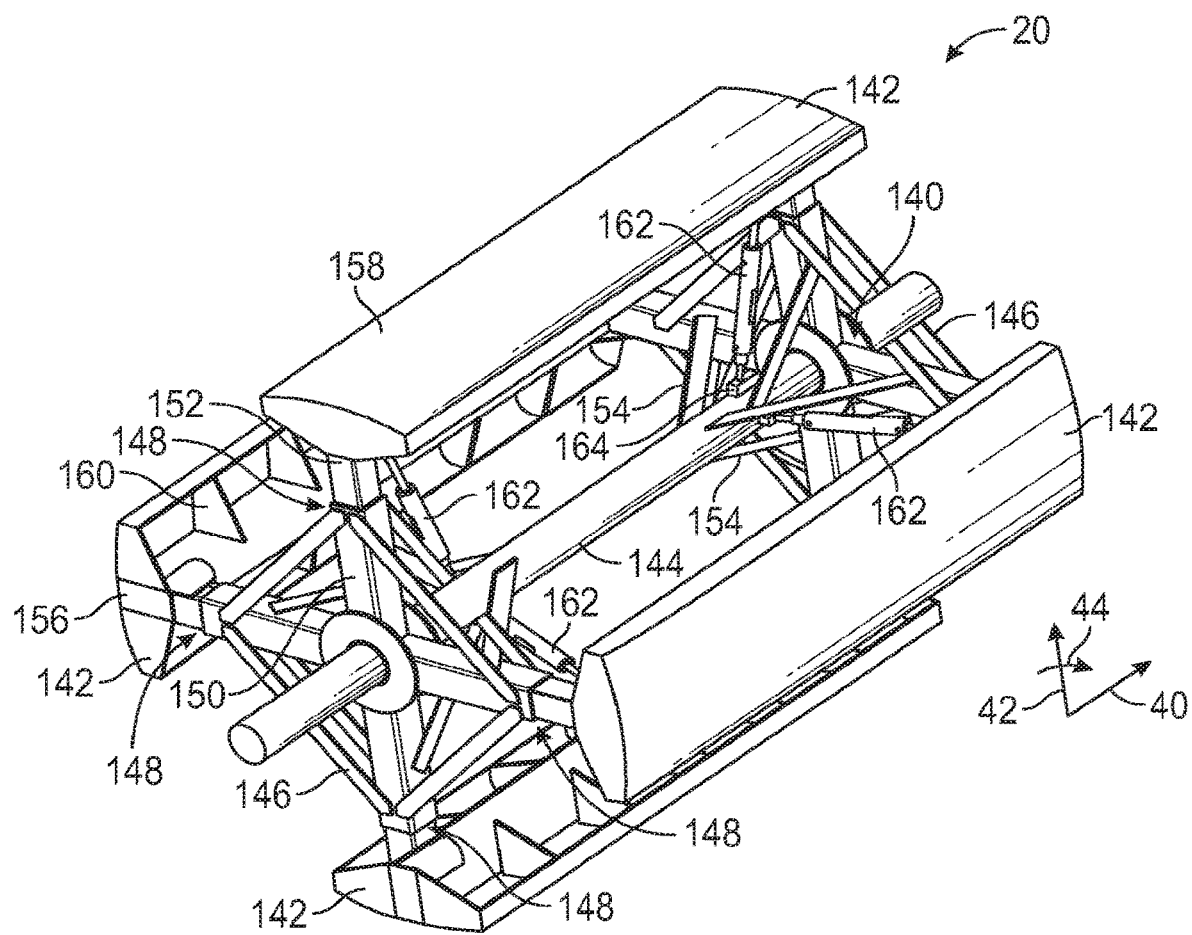
FIG. 8 is a perspective view of an embodiment of a coil drum assembly according to embodiments of the present disclosure.

FIG. 8 illustrates a perspective view of an embodiment of the coil drum assembly 20. As shown in FIG. 8, the coil drum assembly 20 includes a drum frame 140 and a plurality of drum segments 142. The drum frame 140 includes a post 144 and a pair of spoke frames 146 each mounted to one end of the post 144. Post 144 can be a solid bar, but is preferably a hollow tube with open ends for providing a place to grab and manipulate the coil drum assembly 20. Each spoke frame 146 includes expandable spokes 148, extending radially 42 away from post 144. Each expandable spoke 148 includes a hollow tube 150 having a proximal end at the end of post 144 and a distal end away from post 144, and a rigid member 152 (e.g. a solid bar or hollow tube) that telescopically slides in hollow tube 150. A plurality of struts 154 are each mounted to and extend between post 144 and one of the expandable spokes 148, or between one of the expandable spokes 148 to another of the expandable spokes 148. Struts 154 provide mechanical stability, rigidity and support.

The plurality of drum segments 142 are each mounted to the ends of corresponding expandable spokes 148 of spoke frames 146 (parallel to and spaced apart from post 144). Each drum segment 142 includes a rigid member 156 (e.g. solid bar or hollow tube), a curved plate 158 extending over the rigid member 156, and a plurality of gussets 160 supporting the curved plate 158 on the rigid member 156. The coil drum assembly 20 may be made of steel or other rigid metal. The expandable spokes 148 and rigid members 156 may have a rectangular cross section for better rigidity and strength.

Hydraulic cylinders 162 are connected between the post 144 (via connectors 164) and the drum segments 142 of the expandable spokes 148 via similar connectors. Hydraulic cylinders 162 (also commonly called linear hydraulic motors) are mechanical actuators. Hydraulic cylinders 162 are used to move the expandable spokes 148 between a retracted position and an extended position. In the retracted position, the curved plates 158 define a cylindrical section of a smaller diameter than that when in the extended position, as further explained below.

The coil drum assembly 20 is configured to be used to manipulate and/or deploy the coils 12 of spoolable pipe 14. In addition, the coil drum assembly 20 is scalable to work with coils 12 of varying sizes and weights. The telescoping action of the expandable spokes 148 allows the coil drum assembly 20 to contract to a diameter small enough to provide clearance for the coil drum assembly 20 to be inserted into the interior channel 46 of the coil 12. Once the coil drum assembly 20 is inserted into the coil 12 of spoolable pipe 14, the expandable spokes 148 are expanded to contact the interior channel 46 of the coil 12 with all four drum segments 142 with enough pressure on the inside of the coil 12 such that the coil 12 is secured to the coil drum assembly 20. Upon successfully inserting and securing the coil drum assembly 20 into the coil 12 of spoolable pipe 14, the coil drum assembly 20 and coil 12 can be lifted by the first and second towers 22 and 24. For example, the post 144 can be used by the first and second towers 22 and 24 to grab and manipulate the coil drum assembly 20 and thus the coil 12 secured thereto.

Further, although one example of the coil drum assembly 20 is described herein, it is understood that embodiments of the coil deployment system 10 are not limited to only this embodiment. Instead, various embodiments of the coil drum assembly 20 that use other techniques for expanding and contracting, that have different configurations (e.g., different numbers of drum segments 142), or that have additional features may be used interchangeably with the coil deployment system 10. For example, although FIG. 8 shows four drum segments 142, other embodiments of the coil drum assembly 20 may include two, three, five, six, or more drum segments 142. Such embodiments of coil drum assemblies 20 enable the coil deployment system 10 to be used to deploy coils 12 of spoolable pipe 14, which may provide certain advantages over other deployment techniques, such as deploying pipe using reels. For example, one coil drum assembly 20 may be used to handle many coils 12 without the logistics associated with empty reels or spools. In addition, use of the coil drum assembly 20 enables heavier coils 12 of spoolable pipe 14 to be handled and transported because the weight of reels or spools is not involved.

Figure 9:
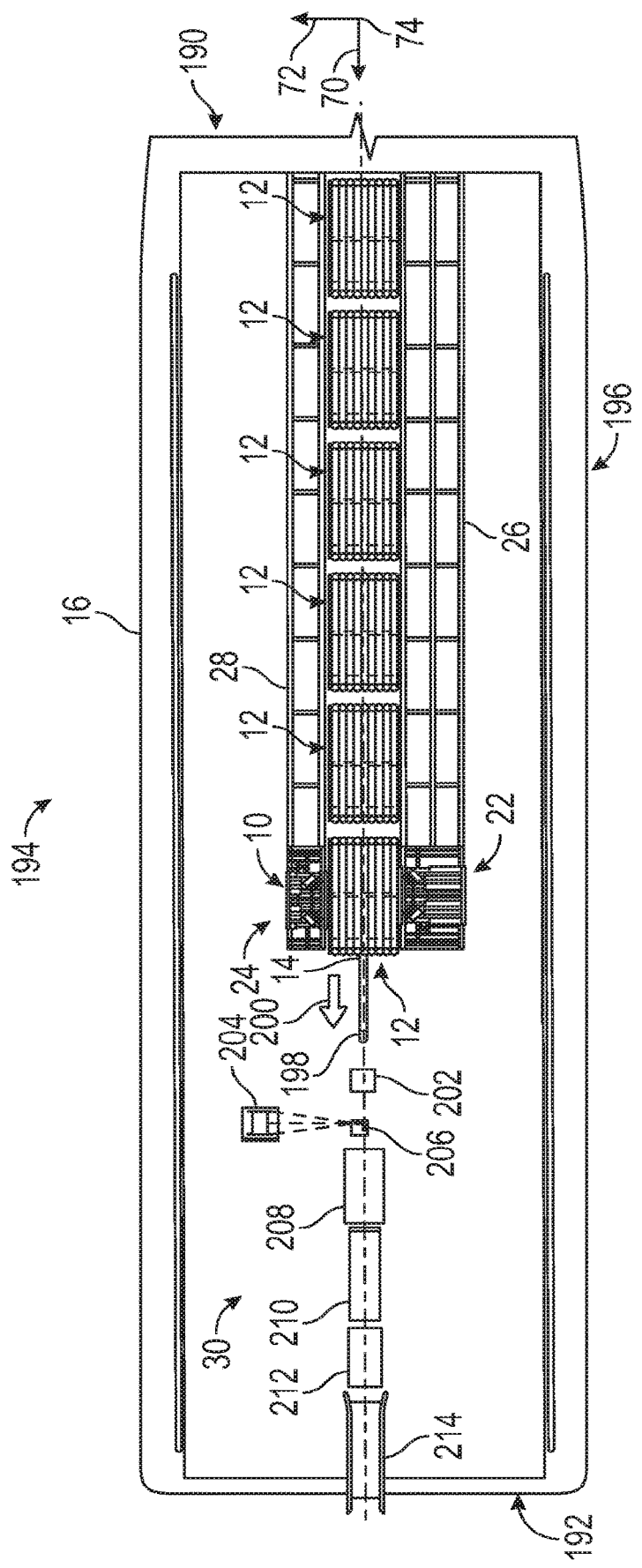
FIG. 9 is a top view of an embodiment of a coil deployment system on a vessel according to embodiments of the present disclosure.

FIG. 9 illustrates a top view of an embodiment of the coil deployment system 10 on the vessel 16, which may be defined by a bow 190, a stern 192, a port side 194, and a starboard side 196. In particular, FIG. 9 illustrates the first step in deploying the spoolable pipe 14 using the coil deployment system 10. As shown in FIG. 9, a plurality of coils 12 are disposed longitudinally 70 between the first and second tracks 26 and 28, which also run longitudinally 70 along the deck of the vessel 16. The interior channels 46 of the coils 12 are generally aligned transversely 72 (e.g., "eye to the side" orientation). Although six coils 12 are shown in FIG. 9, the coil deployment system 10 can be used to deploy any number of coils 12. In addition, although the first and second tracks 26 and 28 are shown generally aligned with the centerline of the vessel 16 in FIG. 9, the first and second tracks 26 and 28 may be aligned in any direction in other embodiments.

As shown in FIG. 9, the first tower 22 may be disposed on the starboard side 196 and the second tower 24 may be disposed on the port side 194. However, the positions of the first and second towers 22 and 24 may be swapped in other embodiments. To begin the deployment process, the first and second towers 22 and 24 are moved longitudinally 70 using the longitudinal drives 98 so the first and second towers 22 and 24 are generally aligned with the coil 12 closest to the stern 192 (e.g., first coil). To speed the deployment process, both the first and second towers 22 and 24 may move simultaneously, but in other embodiments, the first and second towers 22 and 24 could move separately. During the movement of the first tower 22 longitudinally 70, the first tower 22 is located transversely 72 away from the second tower 24 via the transverse drive 120 to enable the coil deployment drum 20 to avoid contact with the coils 12. Once the first tower 22 is aligned with the coil 12, the transverse drive 120 is used to insert the coil deployment drum 20 into the interior channel 46 of the coil 12 and to couple the coil deployment drum 20 to the second tower 24. Prior to insertion into the coil 12, the coil deployment drum 20 may be retracted into the retracted position if the drum 20 is not already in that position. Next, the coil deployment drum 20 is extended into the extended position to secure the coil 12 to the coil deployment drum 20. The lift assemblies 92 of the first and second towers 22 and 24 may then be used to lift the coil 12 away from the deck of the vessel 16. This step provides a gap between the coil 12 and the skid 80 in addition to enabling the spoolable pipe 14 to clear the deck of the vessel 16 during deployment. Next, the rotational drive 90 of the first tower 22 is actuated to begin advancing a pipe pulling head 198 coupled to an end of the spoolable pipe 14 from the coil 12 in the direction of arrow 200. In other embodiments, another component of the coil deployment system 10 may be used to advance the spoolable pipe 14 instead of the rotational drive 90.

During deployment of the spoolable pipe 14, it may pass through or be handled by one or more components of the ancillary equipment 30, as discussed below. In various embodiments, one or more of these components of the ancillary equipment 30 may be omitted depending on the particular deployment situation. For example, a re-rounder 202 may be used to re-round the spoolable pipe 14. In certain embodiments, the spoolable pipe 14 may have an oval cross-sectional shape when coiled. In other words, the spoolable pipe 14 may not have a circular cross-sectional shape. Embodiments of the pipe re-rounder 202 may use rollers or other components with circular, partially-circular, or other shapes to re-shape the spoolable pipe 14 to have a circular or substantially circular cross-sectional shape when the rollers or other components are engaged with or pressed against the spoolable pipe 14.

In certain embodiments, the spoolable pipe 14 may be manipulated using a winch 204 (e.g., an abandonment and recovery winch or A/R winch), which may be used together with a sheave assembly 206 (e.g., A/R sheave assembly). For example, the winch 204 may be used to position the pipe pulling head 198 or other portions of the spoolable pipe 14 through or at the other components of the ancillary equipment 30.

In other embodiments, the spoolable pipe 14 may pass through a swaging system 208 that may be used to swage fittings to an end of the spoolable pipe 14, as described in more detail below.

In further embodiments, the spoolable pipe 14 may pass through a tensioner 210 that may be used to apply tension to the spoolable pipe 14. Specifically, the tensioner 210 may include two or four tracks to pull the spoolable pipe 14 through the tensioner 210 at a desired tension. When the tensioner 210 is used to pull the spoolable pipe 14, the rotational drive 90 of the first tower 22 may not be used. In other words, the rotational drive 90 may be used initially to guide the spoolable pipe 14 to the tensioner 210, which then handles the pulling of the spoolable pipe 14 from the coil 12.

In yet further embodiments, the spoolable pipe 14 may pass through a weight station 212, which may be used to add weights to the deploying spoolable pipe 14 to cause the spoolable pipe 14 to sink to a desired depth in the body of water 18. Finally, in some embodiments, the spoolable pipe 14 may pass through a chute 214, which may be used to maintain a desired bend radius of the spoolable pipe 14 as it enters the body of water 18. The chute 214 may be coupled to the stern 192 of the vessel 16 and be configured to rotate or pivot out of the way when not used. In addition, the components of the chute 214 may be selected to support the weight of the deploying spoolable pipe 14. After passing through the one or more components of the ancillary equipment 30 (e.g., re-rounder 202, winch 204, sheave assembly 206, swaging system 208, tensioner 210, weight station 212, or chute 214), the spoolable pipe 14 continues to be paid out until the coil 12 is emptied. In addition, although the components of the ancillary equipment 30 are shown in a particular sequence in FIG. 9, these components may be positioned in other sequences in other embodiments and one or more components may be omitted.

Figure 10:
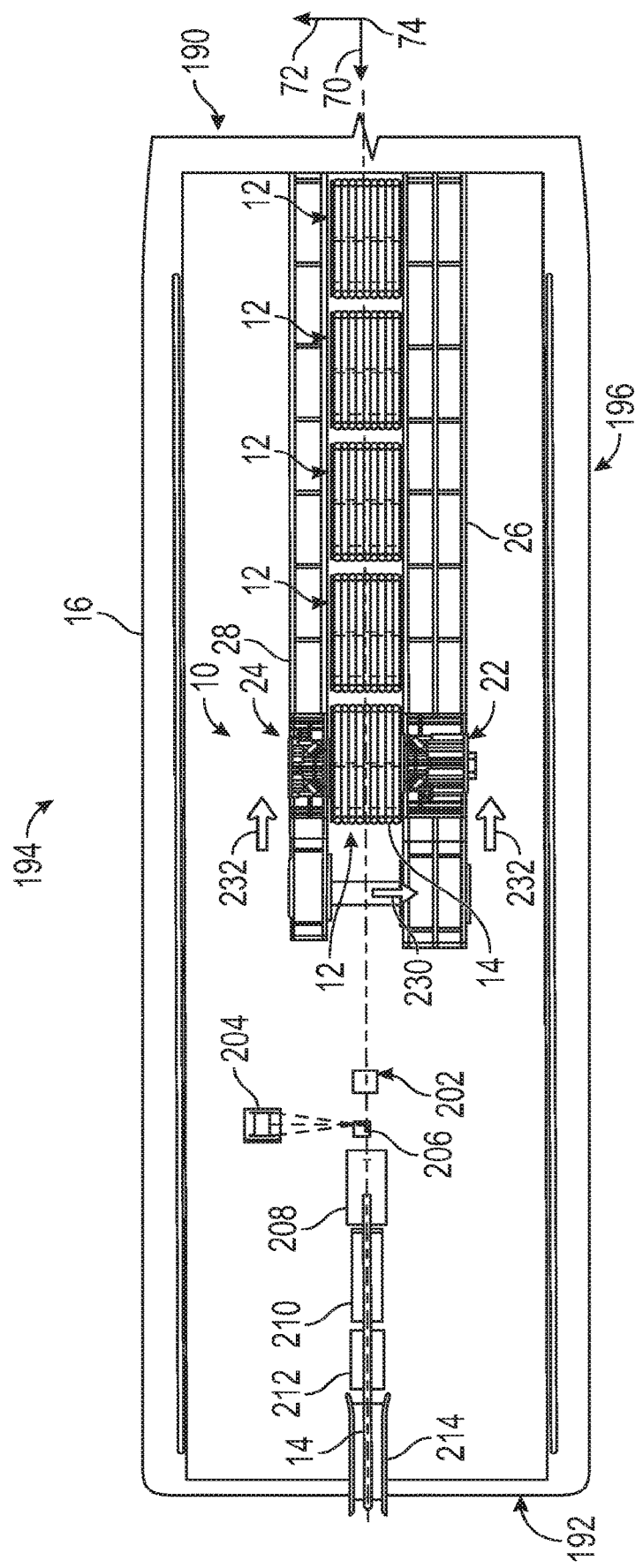
FIG. 10 is a top view of an embodiment of a coil deployment system on a vessel according to embodiments of the present disclosure.

FIG. 10 illustrates a top view of an embodiment of the coil deployment system 10 on the vessel 16. After the first coil 12 is emptied, the remaining end of the spoolable pipe 14 may be held by the tensioner 210. Next, the first tower 22 is moved transversely 72 away from the second tower 24 using the transverse drive 120 in the direction of arrow 230. Both the first tower 22 and the second tower 24 may then be moved longitudinally 70 toward the bow 190 in the direction of arrows 232 using the longitudinal drives 98 until the first and second towers 22 and 24 are aligned with a second coil 12. Although the second coil 12 is shown adjacent to the location of the first coil 12, in other embodiments, the coil deployment system 10 may be used to deploy coils 12 in any order. Next, the lift assemblies 92 of the first and second towers 22 and 24 are used to lower the coil drum assembly 20 toward the deck of the vessel 16. In other embodiments, the lift assemblies 92 of the first and second towers 22 and 24 may be used to lower the coil drum assembly 20 prior to moving the first and second towers 22 and 24 longitudinally 70. In further embodiments, the lift assembly 92 of the first tower 22 may be used to lower the coil drum assembly 20 prior to moving the first tower 22 transversely 72 away from the second tower 24.

Figure 11:
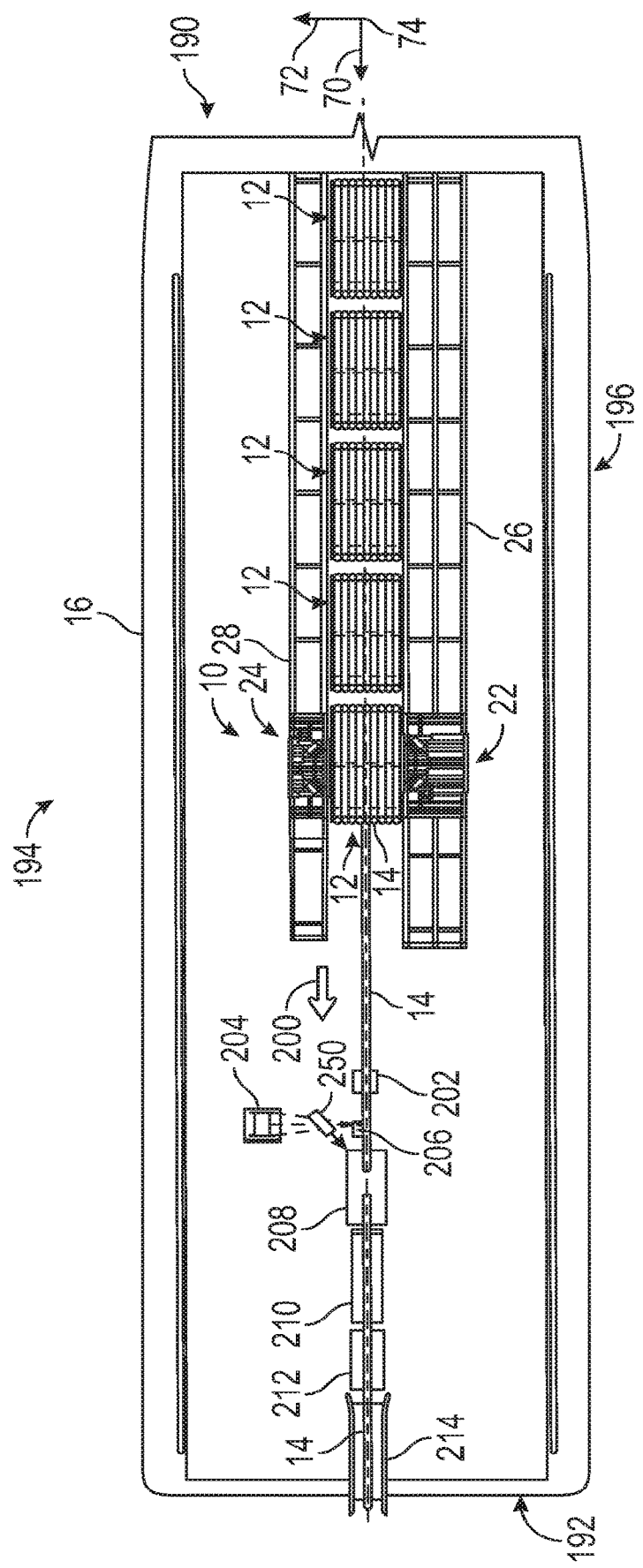
FIG. 11 is a top view of an embodiment of a coil deployment system on a vessel according to embodiments of the present disclosure.

FIG. 11 illustrates a top view of an embodiment of the coil deployment system 10 on the vessel 16. After the first and second towers 22 and 24 are aligned with the second coil 12 as shown in FIG. 10, the steps for deploying the spoolable pipe 14 described with respect to FIG. 9 may be repeated. Namely, the transverse drive 120 is used to insert the coil deployment drum 20 into the interior channel 46 of the coil 12. Next, the coil deployment drum 20 is extended into the extended position to secure the coil 12 to the coil deployment drum 20. The lift assemblies 92 of the first and second towers 22 and 24 may then be used to lift the coil 12 away from the deck of the vessel 16. Next, the rotational drive 90 of the first tower 22 is actuated to begin advancing the spoolable pipe 14 from the coil 12 in the direction of arrow 200 to the swaging system 208. The winch 204 may be used to move a fitting 250 to the swaging system 208. Next the ends of the spoolable pipe 14 (e.g., end from first coil 12 and end from second coil 12) may be swaged together by the fitting 250 using a swaging machine or device of the swaging system 208. In other embodiments, different pipe connection techniques may be used at the swaging system 208, including, but not limited to, bolting, screwing, welding, brazing, electrofusion, cementing, flanging, threading, and so forth. Once the ends of spoolable pipe 14 are joined together, the spoolable pipe 14 from the second coil 12 may continue to be paid out until emptied, similar to how the spoolable pipe 14 from the first coil 12 was paid out as described above.

Figure 12:
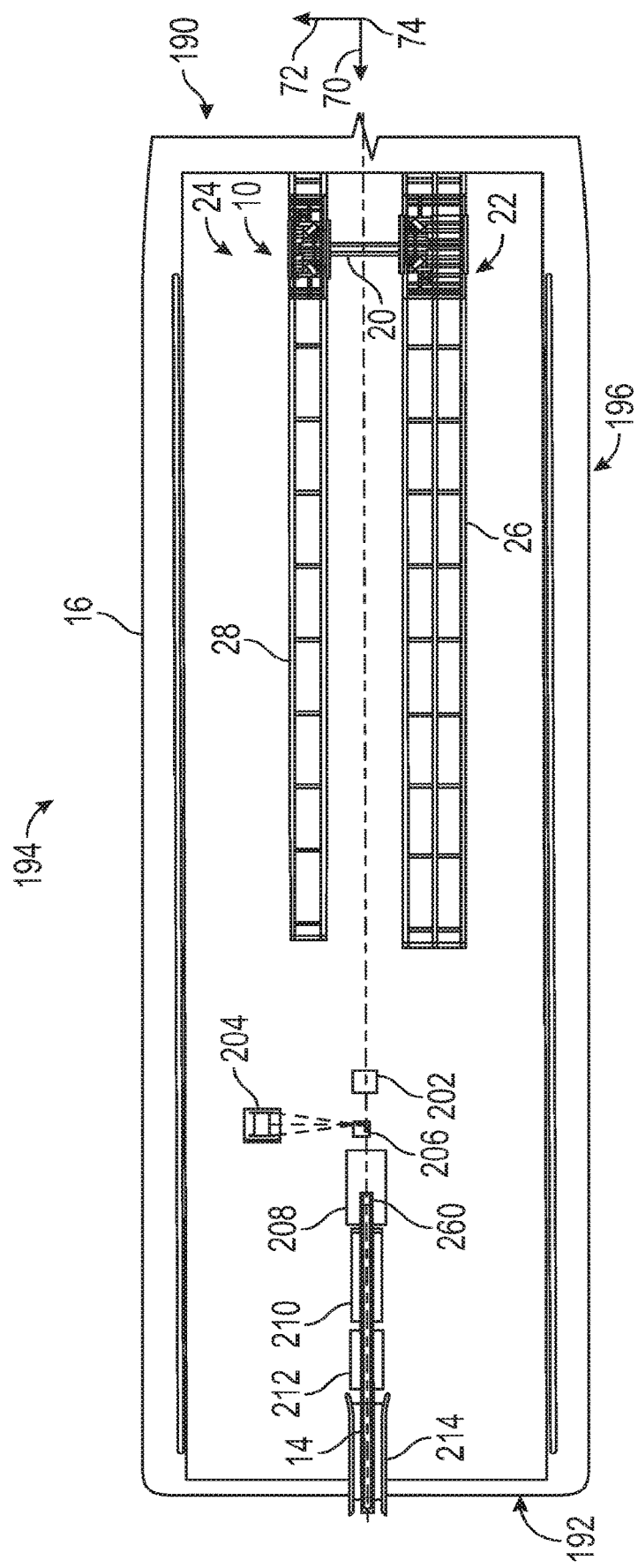
FIG. 12 is a top view of an embodiment of a coil deployment system on a vessel according to embodiments of the present disclosure.

FIG. 12 illustrates a top view of an embodiment of the coil deployment system 10 on the vessel 16. After the second coil 12 is deployed as shown in FIG. 11, the previous steps may be repeated until the desired number of coils 12 have been deployed. As shown in FIG. 12, the first and second towers 22 and 24 are located at the location of the last coil 12 that was deployed. The end of the spoolable pipe 14 may then be secured in the tensioner 210 and a pipe abandonment head 260 swaged onto the end of the spoolable pipe 14 using the swaging system 208. Then, steps that are used to abandon other offshore pipes may be utilized, such as securing a cable from the winch 204 to the abandonment head 260 and paying out the cable from the winch 204 until the abandonment head 260 has reached the seabed. The vessel 16 may then be moved to another location to deploy other coils 12 or back to shore to pick up additional coils 12 for further deployment. In certain embodiments, the coil deployment system 10 may be removed from the vessel 16 to be used on other vessels 16 or the same vessel 16 at a later time.

Figure 13:
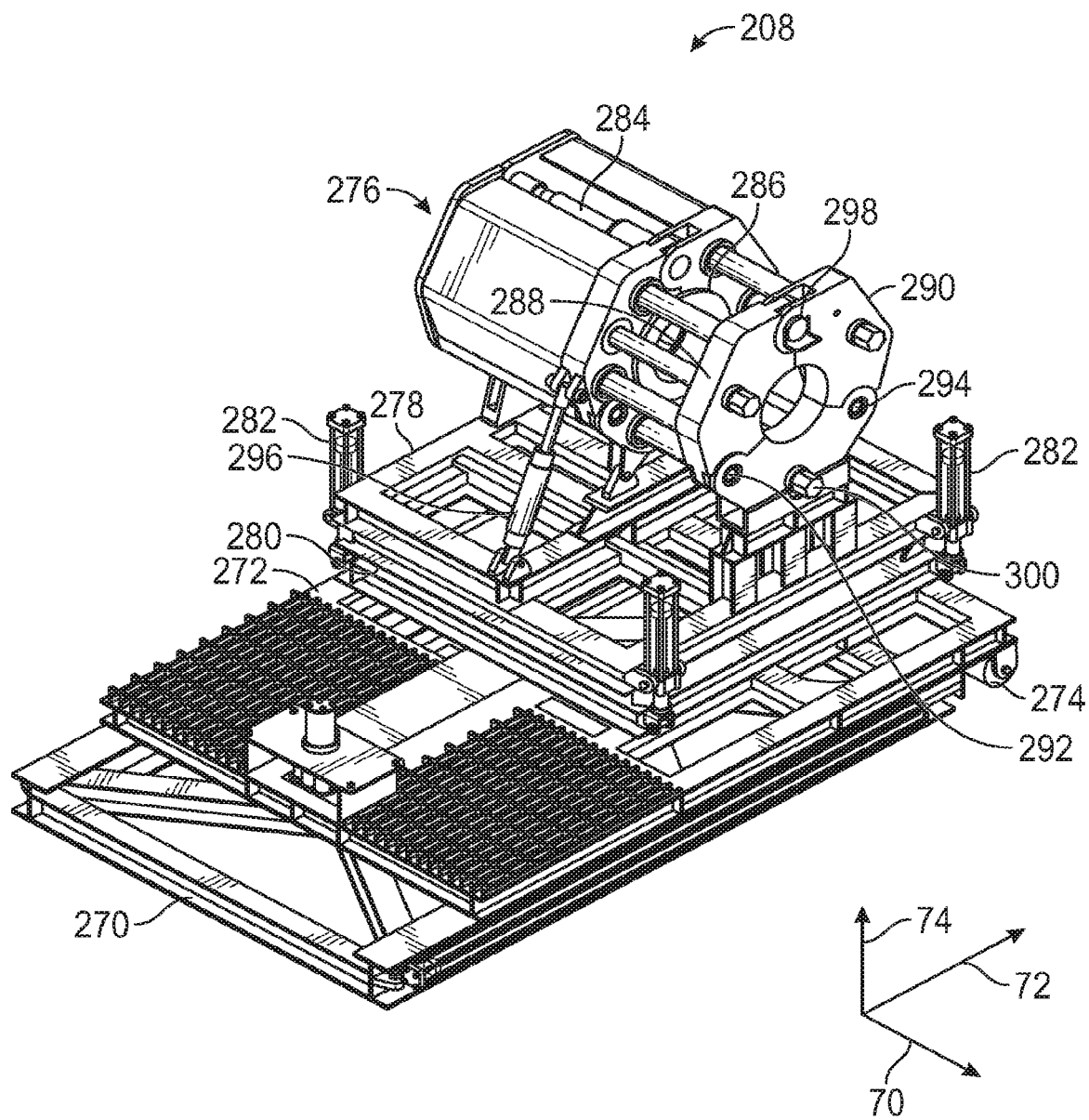
FIG. 13 is a perspective view of an embodiment of a swaging system according to embodiments of the present disclosure.

FIG. 13 illustrates a perspective view of an embodiment of the swaging system 208. In the illustrated embodiment, the swaging system 208 includes a fixed platform 270 and a movable platform 272. The fixed platform 270 may be coupled to the deck of the vessel 16 and the movable platform 272 may slide transversely 72 over the fixed platform 270 via one or more wheels 274. When the swaging system 208 is in a collapsed position as shown in FIG. 13, the movable platform 272 covers the fixed platform 270 such that the movable platform 272 is out of the path of spoolable pipe 14 being deployed.

As shown in FIG. 13, the movable platform 272 includes several components, such as a swage machine 276 disposed on an upper platform 278 that is coupled to a lower platform 280 via a plurality of hydraulic cylinders 282. The swage machine 276 may be used to swage various fittings or connectors onto ends of the spoolable pipe 14, thereby joining together spoolable pipe 14 from different coils 12. The swage machine 276 may also be used to swage the abandonment head 260 onto the spoolable pipe 14. In certain embodiments, the swage machine 276 may include one or more hydraulic cylinders 284 that are used to slide one or more dies 286 over the fitting, thereby exerting a compressive load on the fitting and coupling the fitting to the spoolable pipe 14 in a leak-proof manner. The swage machine 276 may include a first section 288 and a second section 290 that move apart from one another to enable the spoolable pipe 14 to be inserted into the swage machine 276. In other words, the top of the swage machine 276 opens to accommodate the spoolable pipe 14 and provide access to the dies 286. For example, the swage machine 276 may include a first pivot 292 and a second pivot 294 to enable the first and section sections 288 and 290 to move apart from one another. In addition, the swage machine may include pivoting hydraulic cylinders 296 to assist with pivoting the first and section 288 and 290 open and closed. In certain embodiments, the swage machine 276 may include one or more pins 298 to join the first and second sections 288 and 290 in a closed position during the swaging process.

In certain embodiments, the swage machine 276 may include a pivot 300 to enable the entire swage machine 276 to be rotated about the pivot 300, which may provide additional degree of freedom for the swage machine 276 to adapt to different positions and orientations of the spoolable pipe 14 being swaged. In further embodiments, the plurality of hydraulic cylinders 282 may be used to move the upper platform 278 vertically 74 away from the lower platform 280, thereby providing a vertical 74 degree of freedom for the swage machine 276. In yet further embodiments, the plurality of hydraulic cylinders 282 may be configured to move independently from one another to enable the upper platform 278 to be pitched at a variety of different angles and orientations with respect to the lower platform 280, again providing further degrees of freedom for the swage machine 276. The additional degrees of freedom provided by the swage machine 276 may be useful to accommodate different positions, angles, and orientations of the spoolable pipe 14 as the spoolable pipe 14 enters the swaging system 208. Further, although one type of swage machine is shown in FIG. 13, some embodiments of the swaging system 208 may use other swaging or connection techniques for connecting fittings to the spoolable pipe 14 and joining together ends of the spoolable pipe 14.

Figure 14:
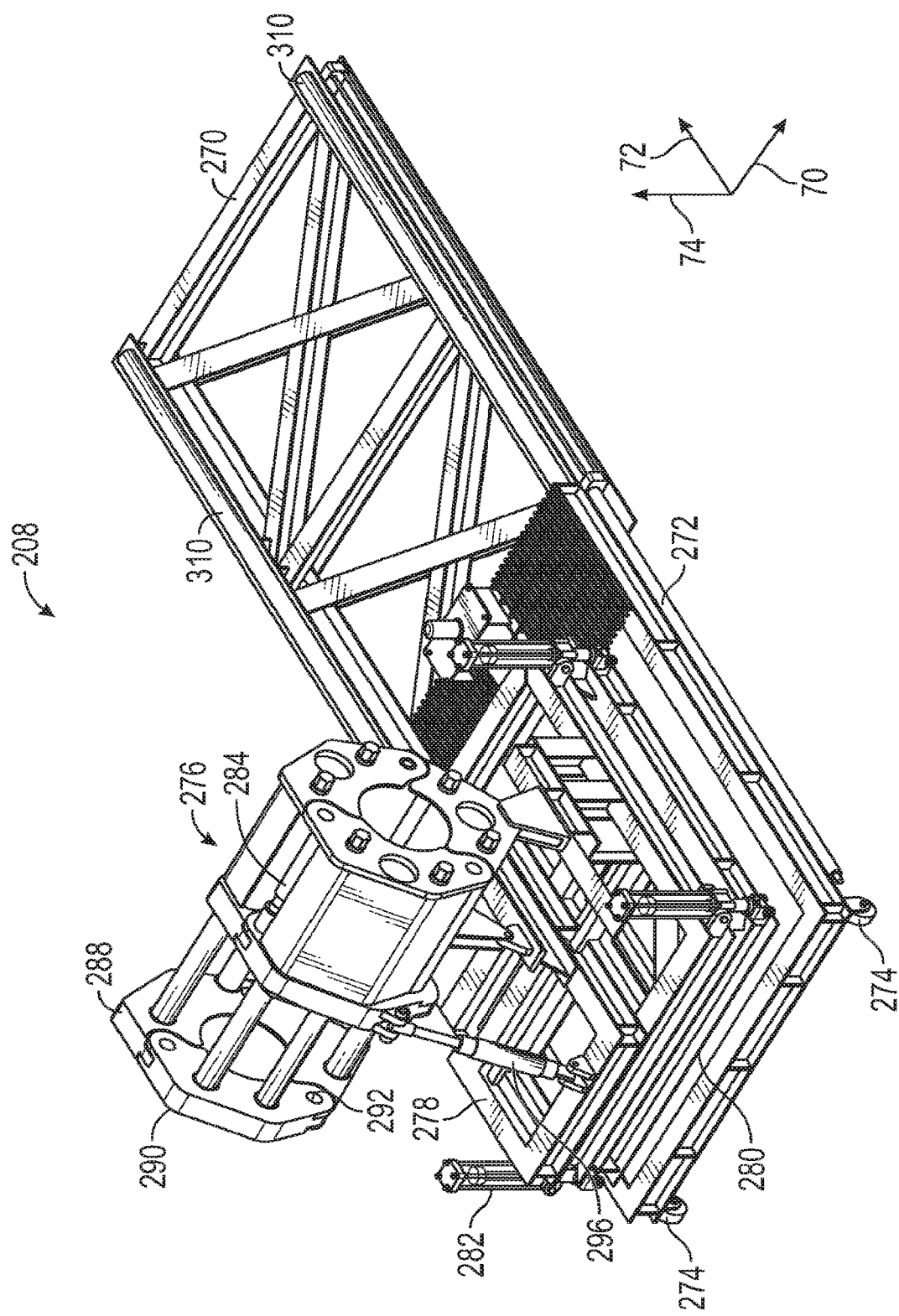
FIG. 14 is a perspective view of an embodiment of a swaging system according to embodiments of the present disclosure.

FIG. 14 illustrates a perspective view of an embodiment of the swaging system 208. As shown in FIG. 14, the movable platform 272 has moved transversely 72 away from the fixed platform 270 via the one or more wheels 274 to be in an expanded position. In other words, the swage machine 276 has moved into position to be used for swaging the spoolable pipe 12. Thus, only a small portion of the movable platform 272 covers the fixed platform 270. As such, the combination of fixed platform 270, movable platform 272, and wheels 274 provides a transverse 72 degree of freedom for the swage machine 276. In certain embodiments, one or more hydraulic cylinders 310 may be used to move the movable platform 272 away from the fixed platform 270. In further embodiments, one or more other techniques may be used for moving the movable platform 272, such as rack and pinion drives, cables, belts, gears, transmissions, and so forth.

Figure 15:
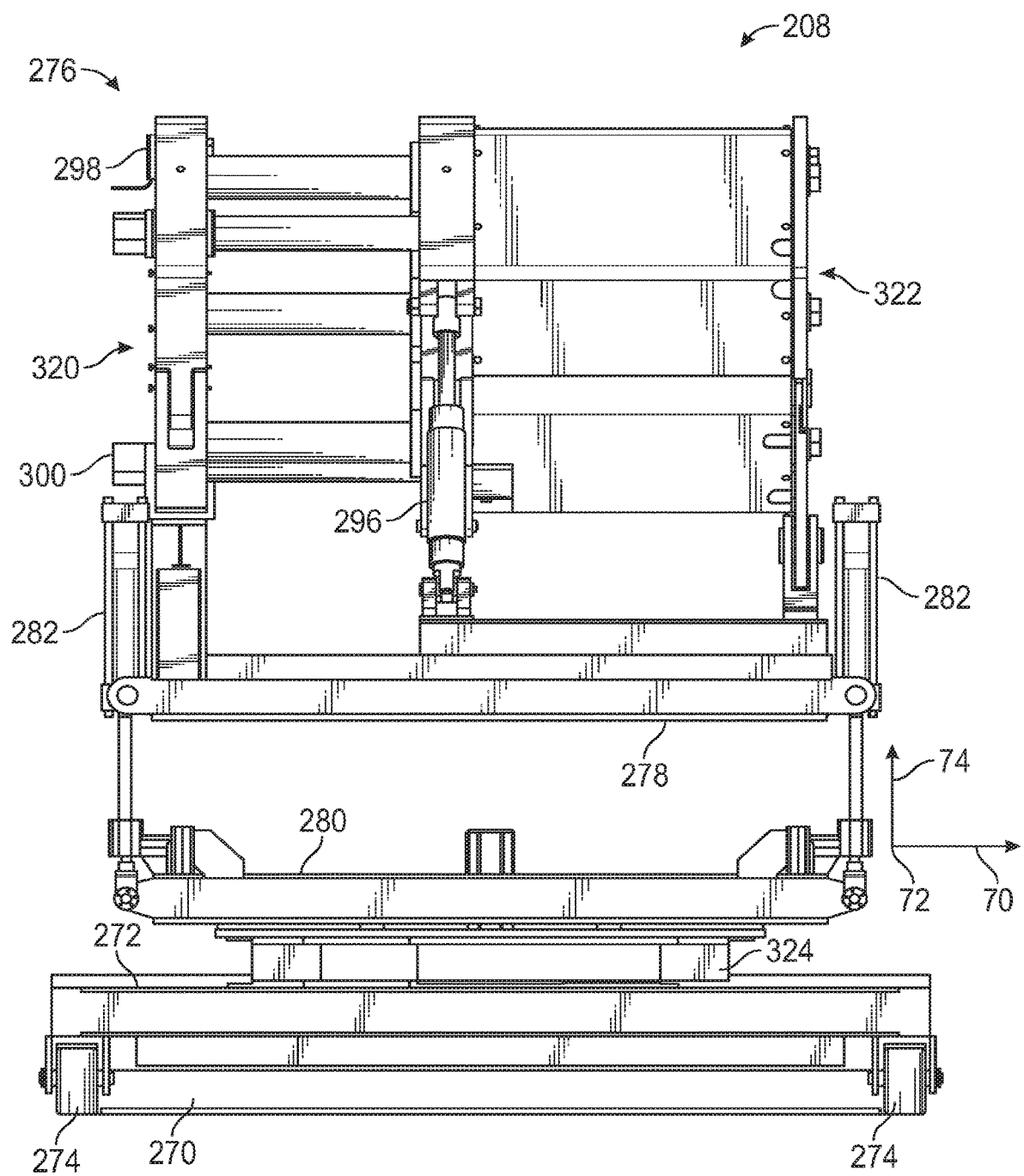
FIG. 15 is a side view of an embodiment of a swaging system according to embodiments of the present disclosure.

FIG. 15 illustrates a side view of an embodiment of the swaging system 208. As shown in FIG. 15, the plurality of hydraulic cylinders 282 have been used to lift the upper platform 278 vertically 74 away from the lower platform 280. Thus, the swage machine 276 is lifted vertically 74 away from the deck of the vessel 16, thereby enabling the swage machine 276 to be more easily used for connecting fittings to the spoolable pipe 14 and joining together ends of the spoolable pipe 14. In addition, as discussed above, the plurality of hydraulic cylinders 282 may move independently from one another to enable an entrance 320 of the swage machine 276 to be pitched lower than an exit 322 or vice versa. Such pitching of the swage machine 276 may be useful to accommodate different angles of the spoolable pipe 14 as the spoolable pipe 14 enters the swage machine 276. In further embodiments, the swage machine 276 may include a rotation mechanism 324 to enable the swage machine 276 (e.g., the lower platform 280) to be rotated with respect to the movable platform 272 as discussed in detail below.

Figure 16:
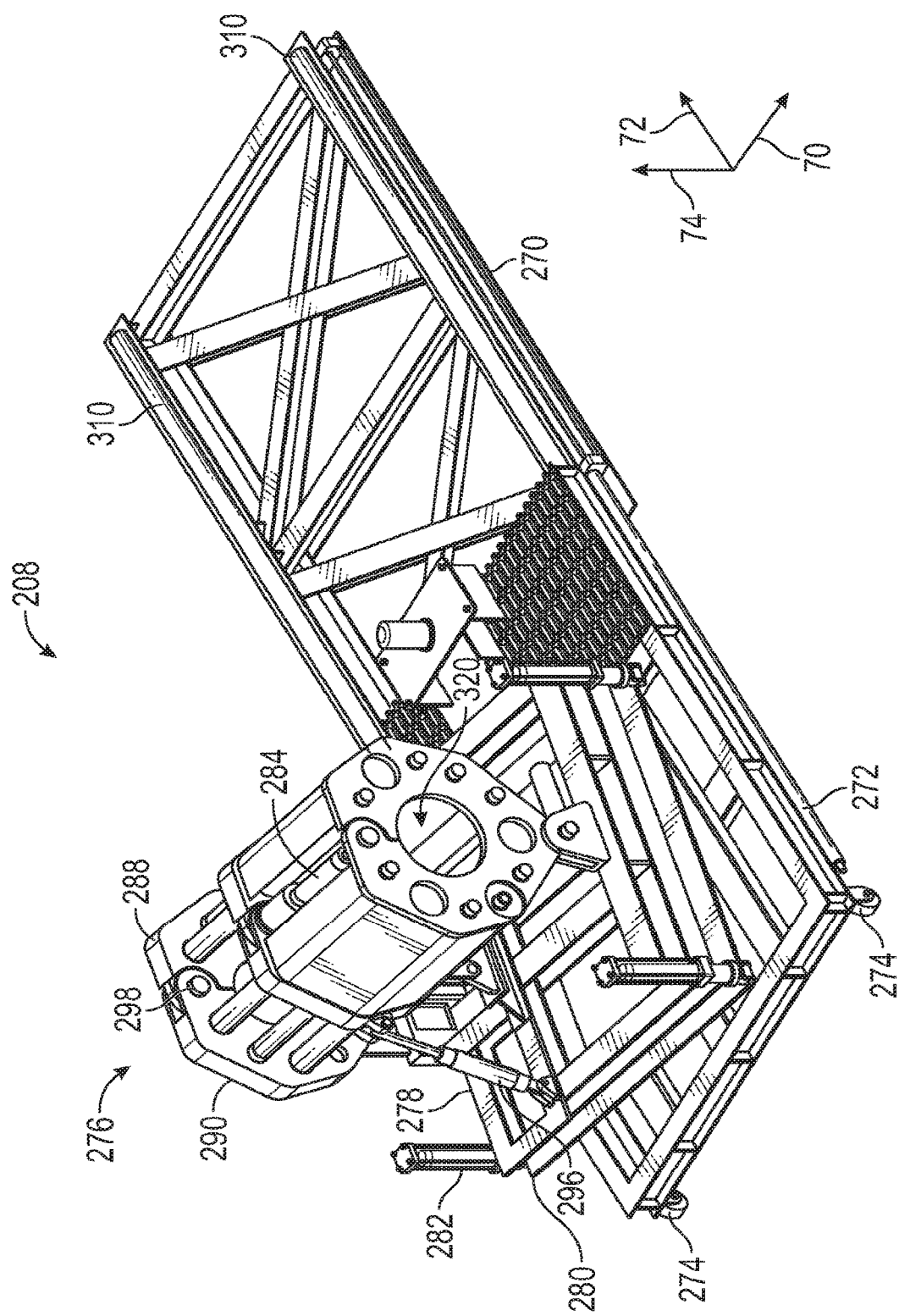
FIG. 16 is a perspective view of an embodiment of a swaging system according to embodiments of the present disclosure.

FIG. 16 illustrates a perspective view of an embodiment of the swaging system 208 in a rotated position. As discussed above, the swaging system 208 may include the rotation mechanism 324 (not shown in FIG. 16) to enable the swage machine 276 to be rotated with respect to the movable platform 272. Thus, the entrance 320 is offset from the longitudinal direction 70, which may be useful to accommodate different angles of the spoolable pipe 14 as the spoolable pipe 14 enters the swage machine 276. The rotation mechanism 324 may include various pivots, turntables, rollers, bearings, and so forth to enable rotational movement of the swage machine 276. In certain embodiments, one or more features of the swaging system 208 may be omitted depending on the needs of a particular deployment of spoolable pipe 14.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system for deploying a coil of spoolable pipe from a vessel, comprising:
 a first tower configured to move longitudinally and transversely along a first track coupled to the vessel; and
 a coil drum assembly coupled to the first tower, wherein the first tower is configured to insert the coil drum assembly transversely into an interior channel of the coil when the coil drum assembly is in a retracted position, and the coil drum assembly is configured to support the coil when the coil drum assembly is in an extended position and rotate during deployment of the spoolable pipe.

2. The system of claim 1, comprising a second tower configured to move longitudinally along a second track coupled to the vessel, wherein the first tower and the second tower are configured to move the coil drum assembly vertically.

3. The system of claim 2, wherein each of the first tower and the second tower comprises a coil containment system configured to contain the spoolable pipe disposed on the coil drum assembly between the coil containment systems, the coil containment system comprising a plurality of rollers to reduce friction between the spoolable pipe and the coil containment system.

4. The system of claim 1, wherein the coil drum assembly comprises:
   a post;
   expandable spokes, wherein each of the expandable spokes extends away from the post and has a distal end movable between a retracted position and an extended position;
   first and second spoke frames mounted to the post, wherein each of the first and second spoke frames includes a plurality of the expandable spokes;
   a plurality of drum segments each mounted to the distal end of one of the expandable spokes of the first spoke frame and to the distal end of one of the expandable spokes of the second spoke frame, wherein the drum segments extend parallel to the post; and
   a plurality of mechanical actuators each extending between the post and one of the expandable spokes or one of the drum segments, for moving the expandable spokes between the retracted and extended positions.

5. The system of claim 1, comprising:
   a re-rounder configured to re-round the spoolable pipe;
   a swaging system configured to swage a fitting to an end of the spoolable pipe;
   a tensioner configured to apply tension to the spoolable pipe; and
   a chute configured to maintain a desired bend radius of the spoolable pipe.

6. The system of claim 5, wherein the swaging system comprises:
   a fixed platform;
   a moveable platform that is configured to slide transversely over the fixed platform; and
   a swage machine of the swaging system mounted on the movable platform, wherein the swaging system is configured to move the swage machine at least one of transversely, vertically, or rotationally.

7. The system of claim 1, wherein the first tower comprises a drag brake configured to apply a braking force to stop or slow the rotation of the coil drum assembly.

8. A system for deploying a coil of spoolable pipe from a vessel, comprising:
   a first tower coupled to the vessel and configured to move along a surface of the vessel;
   a second tower coupled to the vessel and configured to move along the surface of the vessel; and
   a coil drum assembly coupled to the first tower, wherein the first tower is configured to insert the coil drum assembly into an interior channel of the coil when the coil drum assembly is in a retracted position, the coil drum assembly is configured to support the coil when the coil drum assembly is in an extended position and rotate during deployment of the spoolable pipe, and the first tower and the second tower are configured to move the coil drum assembly toward or away from the surface of the vessel.

9. The system of claim 8, wherein each of the first tower and the second tower comprises a longitudinal drive configured to move the respective tower longitudinally along the respective track, the longitudinal drive comprising a gripping assembly slidingly engaged with the respective track and a hydraulic cylinder or a rack and pinion system coupled to the respective tower and the gripping assembly.

10. The system of claim 8, wherein each of the first tower and the second tower comprises a lift assembly configured to move the coil drum assembly vertically, the lift assembly comprising a rack and pinion system or a hydraulic cylinder.

11. The system of claim 8, wherein the first tower comprises a transverse drive configured to move the first tower transversely, the transverse drive comprising a hydraulic cylinder or a rack and pinion system.

12. The system of claim 8, wherein the first tower comprises a drag brake configured to apply a braking force to stop or slow the rotation of the coil drum assembly.

13. The system of claim 8, wherein the first tower comprises a rotational drive configured to rotate the coil drum assembly, the rotational drive comprising a motor.

14. A method, comprising:
   moving a first tower and a coil drum assembly coupled to the first tower longitudinally along a first track coupled to a vessel to a location of a first coil of spoolable pipe;
   retracting a coil drum assembly into a retracted position;
   moving the first tower transversely along the first track to insert the coil drum assembly into an interior channel of the first coil when the coil drum assembly is in the retracted position;
   extending the coil drum assembly into an extended position to support the first coil;
   moving the coil drum assembly upwardly using the first tower; and
   rotating the coil drum assembly to deploy the first coil.

15. The method of claim 14, comprising:
   moving a second tower longitudinally along a second track coupled to the vessel to the location of the first coil of spoolable pipe; and
   moving the coil drum assembly upwardly using the first tower and the second tower.

16. The method of claim 14, wherein retracting or extending the coil drum assembly comprises actuating a plurality of mechanical actuators of the coil drum assembly each extending between a post of the coil drum assembly and one of expandable spokes of the coil drum assembly or one of drum segments of the coil drum assembly.

17. The method of claim 14, comprising rotating the coil drum assembly via a rotational drive of the first tower, wherein the rotational drive comprises a motor.

18. The method of claim 14, comprising applying a braking force via a drag brake to stop or slow rotation of the coil drum assembly.

19. The method of claim 14, comprising:
   re-rounding the spoolable pipe using a re-rounder;
   swaging a fitting to an end of the spoolable pipe using a swaging system;
   applying tension to the spoolable pipe using a tensioner; and
   maintaining a desired bend radius of the spoolable pipe using a chute.

20. The method of claim 19, comprising moving a swage machine of the swaging system at least one of transversely, vertically, or rotationally, wherein the swaging system comprises:
   a fixed platform; and a moveable platform that is configured to slide transversely over the fixed platform, wherein the swage machine is mounted on the movable platform.

\* \* \* \* \*